United States Patent
Murakami

[11] Patent Number: 5,850,401
[45] Date of Patent: Dec. 15, 1998

[54] CIRCUIT FOR GENERATING RTS SIGNAL OF A GRAY CODE

[75] Inventor: Kurenai Murakami, Tokyo, Japan

[73] Assignee: NEC Corporation, Tokyo, Japan

[21] Appl. No.: 646,381

[22] Filed: May 31, 1996

[30] Foreign Application Priority Data

May 31, 1995 [JP] Japan ................................ 7-134259

[51] Int. Cl.⁶ .................................................. H04J 3/06
[52] U.S. Cl. ........................ 370/516; 370/395; 370/465; 375/356; 375/371
[58] Field of Search ................................ 370/232, 233, 370/252, 395, 465, 466, 516, 521; 375/354, 356, 364, 371, 376

[56] References Cited

U.S. PATENT DOCUMENTS

| | | | |
|---|---|---|---|
| 5,084,841 | 1/1992 | William et al. | 365/189.07 |
| 5,260,978 | 11/1993 | Fleischer et al. | 375/354 |
| 5,448,606 | 9/1995 | Snelgrove | 377/34 |
| 5,506,835 | 5/1996 | McTiffin | 375/354 |
| 5,608,731 | 3/1997 | Upp et al. | 370/516 |
| 5,654,962 | 8/1997 | Rostoker et al. | 370/232 |

*Primary Examiner*—Douglas W. Olms
*Assistant Examiner*—Shick Hom
*Attorney, Agent, or Firm*—Foley & Lardner

[57] ABSTRACT

In an RTS generator used in an ATM network where a network reference clock is continuously counted to produce the lower four bits of a counted number, which are, in turn, latched in response to a latching pulse signal produced by frequency dividing a CBR clock by N=3008, the latched number providing the RTS, the lower four bits are formed on the base of the Gray code so as to avoid latching of abnormal number even in racing condition between the change of the counted number and a rising of the latching pulse.

20 Claims, 5 Drawing Sheets

CIRCUIT FOR GENERATING RTS SIGNAL OF A GRAY CODE

BACKGROUND OF THE INVENTION

The present invention relates to timing recovery for an ATM (Asynchronous Transfer Mode) network transporting a CBR (Constant Bit Rate) signal therethrough and, in particular, to a circuit for generating an RTS (Residual Time Stamp) signal used in an SRTS (Synchronous Residual Time Stamp) technique performing for the timing recovery.

The ATM network is a B-ISDN (Broadband-Integrated Service Digital Network) using the ATM which is known to be a packet oriented technology. The ATM network requires a CLAD (Cell Assembly and Disassembly) which comprises a CLA (Cell Assembly) section for forming cells from an information source signal or a data source signal to be transmitted and a CLD (Cell Disassembly) for reproducing the cells into the original information signal or the data signal.

In various CBR signals, as the information source signals, there is one which has a clock signal thereof which is independent from the network clock. In such a case, it is necessary to transmit information of the clock frequency of the CBR signal through the ATM network together with the cells for the timing recovery. In order to meet the requirement, ITU-T Recommendation I.363 adapted the SRTS (Synchronous Residual Time Stamp) as a standard for timing recovery for the AAL (ATM Adaptation Layer) type 1. The CLAD using the SRTS standard has the RTS generating circuit in the CLA section.

In transmission of the information of the CBR clock frequency, the CBR signal is separated into blocks each having N (integer) bits. A time instant when the CLA section receives a leading head of the separated blocks is measured by a scale of the network reference clock frequency $f_{nx}$. The measured instant is determined as a TS (time stamp). In this connection, the CBR clock frequency $f_s$ is generally small in its frequency deviation, the digits of the TS higher than $2^{p+1}$ are substantially maintained constant for a certain number. Accordingly, the digits higher than $2^{p+1}$ do not need to be transmitted. Therefore, it will be understood that the bits or the digits equal to or lower than $2^p$ are all to be transmitted for the timing recovery. Those digits equal to or lower than $2^p$ are referred to as the RTS.

The CLA section produces 8 cells which include N-bit of the information with the RTS and sends out the cell through the ATM network.

When the time of the N bits of the CBR signal with the CBR clock frequency $f_s$ is represented by $T (=N/f_s)$, the time T is determined to be a time period for sending out the RTS. Therefore, the difference M between an adjacent set of two RTSs sequentially sent out is given by $f_{nx}T$. In practice, RTS is represented by an integer and, therefore, an integer Md, which is adjacent M, is used for M.

The CLD section derives RTS signals from the cells received, and obtains Md which is a difference of the subsequent two RTSs. Then, $T (=Md/f_x)$ is reproduced from Md and $f_{nx}$ and the CBR clock frequency $f_s$ is reproduced by multiplication of N and 1/T.

In the cell format according to the AAL type 1, CSI (Convergence Sublayer Indication) bit in odd number SC (Sequence Count field) is used for RTS transportation. Therefore, RTS comprises four bits which are transferred through eight cells. This means p=4.

A known RTS generator used in the CLA section comprises a four-bit counter for continuously counting the network reference clock $f_{nx}$ to produce a counted number which is a four-bit binary number. On the other hand, the CBR clock signal $f_s$ is frequency divided by N to produce a latching pulse signal. The four-bit binary number is latched at a latching circuit in response to the latching pulse signal. The latched four-bit binary number provides the RTS.

In the known RTS generating circuit, the RTS is given an abnormal number when the output of the four-bit binary counter and the latching pulse signal are put in a so called racing condition, as will later be described in detail. This disables the CLD section in the reception side from reproducing the CBR clock from the RTS.

SUMMARY OF THE INVENTION

Therefore, it is an object of this invention to provide an RTS generating circuit which enables producing not an abnormal RTS, but a correct RTS, even when the counter output and the latching pulse are put in the racing condition.

This invention is applicable to an RTS (Residual Time Stamp) generating circuit for use in an ATM (Asynchronous Transfer Mode) network to transfer a user's signal using a network clock signal of a network clock frequency, the network clock signal being frequency-divided by a predetermined dividing value to form a network reference clock signal of a divided frequency as a network reference frequency, and the user's signal having a user's clock signal having a user's clock frequency.

According to this invention, the RTS generating circuit comprises: counter means for counting the network reference clock signal to produce a counted number on the base of the Gray code; dividing means responsive to the user's clock signal for frequency-dividing the user's clock frequency to produce a divided signal of a divided frequency as a latching pulse signal; and latching means coupled to the counter means and the dividing means and responsive to the latching signal for latching the counted number to produce a latched number of the Gray code, the latched number providing the RTS signal.

The RTS generating circuit may further comprise frequency dividing means for dividing the network clock signal to produce the network reference clock signal.

The RTS generating circuit may further comprise converter means for converting the latched number of the Gray code into a number of the conventional binary code, as the RTS signal.

In the RTS generating circuit, the counter means is a four-bit counter for delivering the lower four bits of the counted number of the Gray code.

The terms "binary code" means a code in which each allowable position has one of two possible states, commonly 0 and 1. The typical one is the binary number system. Therefore, the terms "binary code" is usually and conventionally used for the binary number system.

Throughout the present description, the terms of mere "binary code" or the other terms of "conventional binary code" are used to mean the binary number system.

In the art, the terms "Gray code" are known as a modified binary code in which sequential numbers are represented by expressions that differ only in one bit, to minimize errors. The Gray code is also referred to as "reflective code". In the present invention, the Gray code is used for producing the RTS.

DESCRIPTION OF PREFERRED EMBODIMENTS

Prior to description of preferred embodiments of this invention, description will be made with regard to a known RTS generating circuit with reference to FIGS. 1 and 2, so as to help promote more understanding of this invention.

Figure 1:
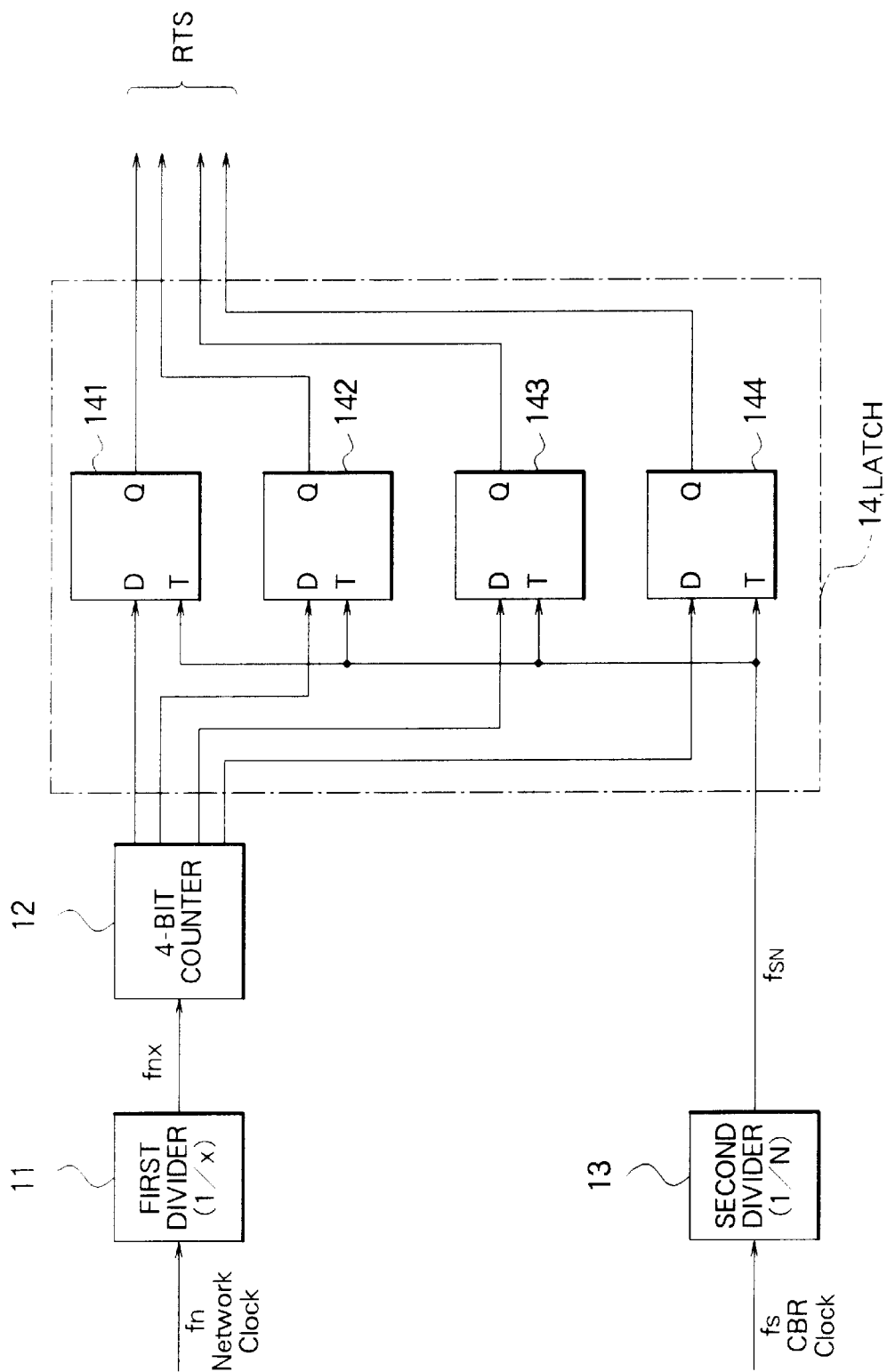
FIG. 1 is a block diagram view illustrating a known RTS generating circuit.

Referring to FIG. 1, the known RTS generating circuit comprises a first divider 11 responsive to a network clock signal of a network clock frequency $f_n$ (for example, 155.52 MHz) for dividing the network clock frequency $f_n$ by x, x being a predetermined dividing numeral (for example, x=2), to produce a network reference clock signal of a reference frequency $f_{nx}$, a four-bit (4-bit) counter 12 responsive to the network reference clock signal of the frequency $f_{nx}$ to continuously count (that is, the four-bit counter 12 is in a free-run condition) the network reference clock signal to produce a counted number on the base of the binary code. Four-bit signals representative of the lower four digits of the counted number are delivered, as a four-bit counter output, to its output of four digit output terminals. Also, a CBR clock signal of a CBR clock frequency $f_s$ (for example 44.736 MHz) of a CBR signal, or a user's signal, to be transmitted is divided by a second divider 13 by N which is a bit length of one block of the CBR signal to produce a divided CBR clock signal of a frequency $f_{sN}$ as a latching pulse signal. ITU-T Recommendation I.363 recommends that $f_s < f_n < 2f_s$ and N=3008. The four-bit counter output from the four-bit counter 11 is applied to a latch circuit 14 and is latched as a latched signal thereat by the latching pulse signal from the second divider 13. The latched signal is delivered from the latch circuit 14 as the RTS signal.

The latch circuit 14 comprises four D-flipflop circuits 141–144 which have D-input terminals connected to the four digit output terminals of the four-bit counter 12, respectively, T-input terminals connected to an output of the second divider 13 to latch the four-bit signal as a latched signal by the latching pulse signal from the second divider 13. The latched signal provides the RTS signal.

In the known RTS signal generating circuit, it is possible that the latched signal is abnormal, which occurs, for example when a change of the four-bit counter output and a rising of the latching pulse signal occur coincidentally with each other, that is, are put in the so called racing condition.

Figure 2:
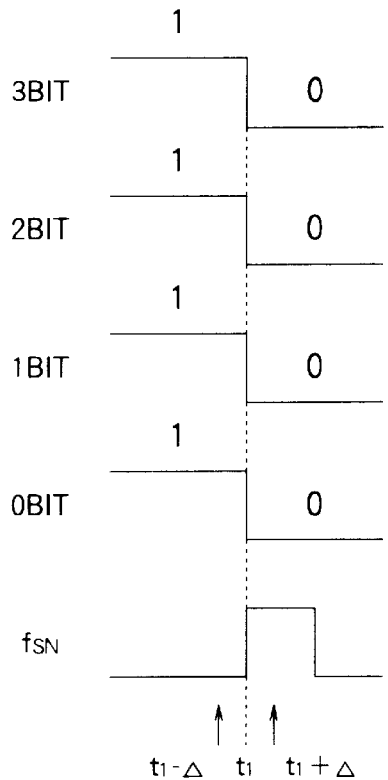
FIG. 2 is a view illustrating the racing condition in the known circuit of FIG. 1.

Referring to FIG. 2, if the latching pulse signal rises at the same time instant $t_1$ when the four-bit counter output changes from "1111" to "0000", it is not determined which is latched at each of D-flipflops 141–144, "1" or "0". Accordingly, it is not known which one of 16 binary numbers of "0000" through "1111" is in the latch circuit 14, although "1111" would be latched when the latching pulse signal rises at a time instant $(t_1-\Delta)$, slightly before the time instant $t_1$, or "0000" would be latched when the latching pulse signal rises at another time instant $(t_1+\Delta)$, slightly after the time instant $t_1$.

Figure 3:
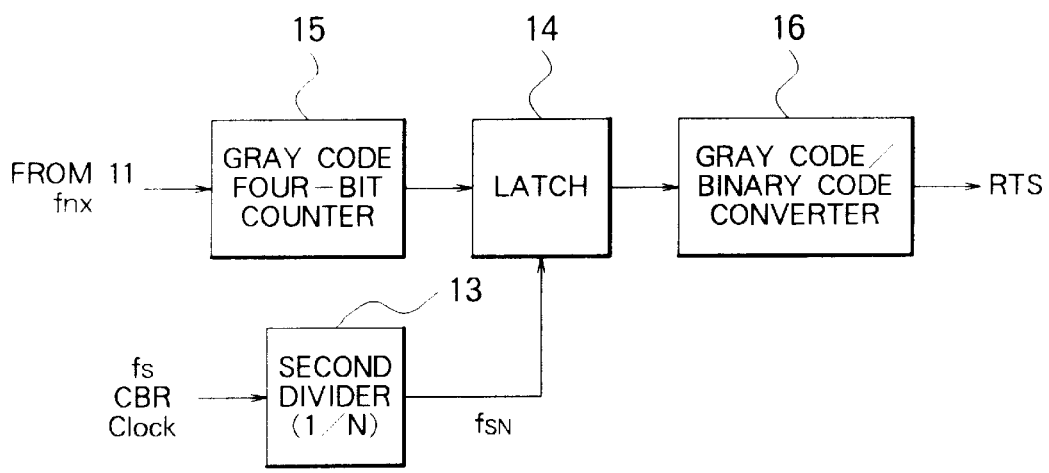
FIG. 3 is a block diagram view illustrating an RTS generating circuit according to one embodiment of the present invention.

Referring to FIG. 3, the RTS generating circuit according to an embodiment of this invention is similar to the known circuit of FIG. 1 except a Gray code four-bit counter 15 is used in place of the four-bit counter 12, and a Gray code/binary code converter is used. The similar parts are shown by the same reference numerals as in FIG. 1 and are not described again for the purpose of simplifying the description.

The Gray code four bit counter 15 counts the network reference clock signal of the reference frequency $f_{nx}$ from the first divider (11 in FIG. 1) and produces a counted number on the base of the Gray code. The four-bit signal representative of the lower four digits of the counted number is delivered on the four digit output terminals as a four-bit counter output.

Four-bit numbers based on the binary code and the Gray code are shown in the following Table together with the corresponding decimal numbers.

TABLE

| Decimal Code | Binary Code | Gray Code |
| --- | --- | --- |
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

The four-bit counter output from the Gray code four-bit counter 15 is also latched by the latching pulse signal from the second divider 13.

As will be understood from the Table, sequential sets of four-bit numbers of the Gray code are represented by expressions that differ only in one bit. Therefore, even if the change of the four-bit counter output and the rising of the latching pulse signal are put in the racing condition, the latched number will be either one number before the change of the four-bit counter output or another number after the change. Therefore, the latched number will not be abnormal.

Figure 4:
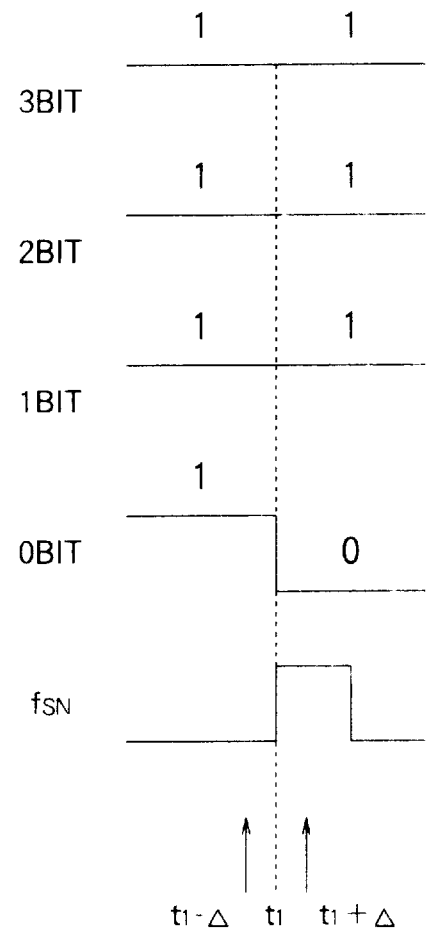
FIG. 4 is a view illustrating the racing condition in the circuit of FIG. 3.

Referring to FIG. 4, if the latching pulse signal rises at the same time instant $t_1$, when the four-bit counter output changes from "1111" to "1110", it is not determined only in 0-th bit which is latched, "1" or "0", while "1" is maintained in the first to third bits. Accordingly, "1111" or "1110" is latched in the latch circuit 14. The former "1111" would be the one latched when the latching pulse signal rises at a time instant $(t_1-\Delta)$, slightly before the time instant $t_1$ and the latter "1110" would be one latched when the latching pulse signal rises at another time instant $(t_1+\Delta)$, slightly after the time instant $t_1$.

The latched signal is then applied to the Gray code/binary code converter 16 and is converted into a binary number which is delivered as the RTS signal from the RTS generating circuit.

If the RTS signal is permitted to be represented by the Gray code in the network, it is of course possible to omit the Gray code/binary code converter 16.

Figure 5:
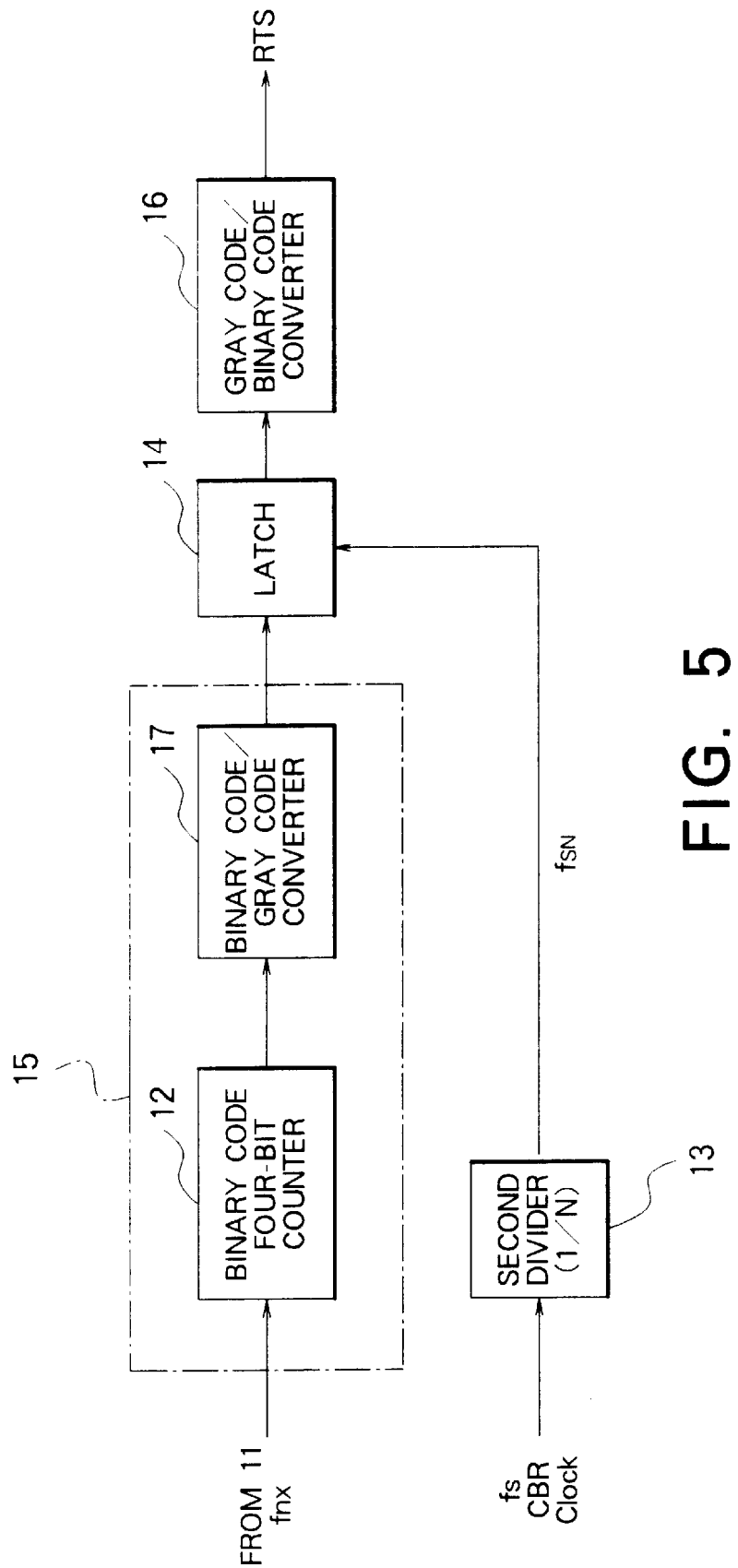
FIG. 5 is a block diagram view of a modified RTS generating circuit according to another embodiment.

Referring to FIG. 5, a modification of the RTS generating circuit is shown, wherein the binary code four-bit counter 12 and a binary code/Gray code converter 17 are used in place of the Gray code four-bit counter 15 in FIG. 3. In the modified circuit, the network reference clock signal is continuously counted by the binary code four-bit counter 12 to produce the four-bit counter output of the binary code in a similar manner as in FIG. 1. The four bit counter output of the binary code is converted or translated into the four-bit counter output of the Gray code, which is applied to the latch circuit 14. Therefore, it will be understood that the modified RTS generating circuit operates in the similar manner as that in FIG. 3.

Figure 6:
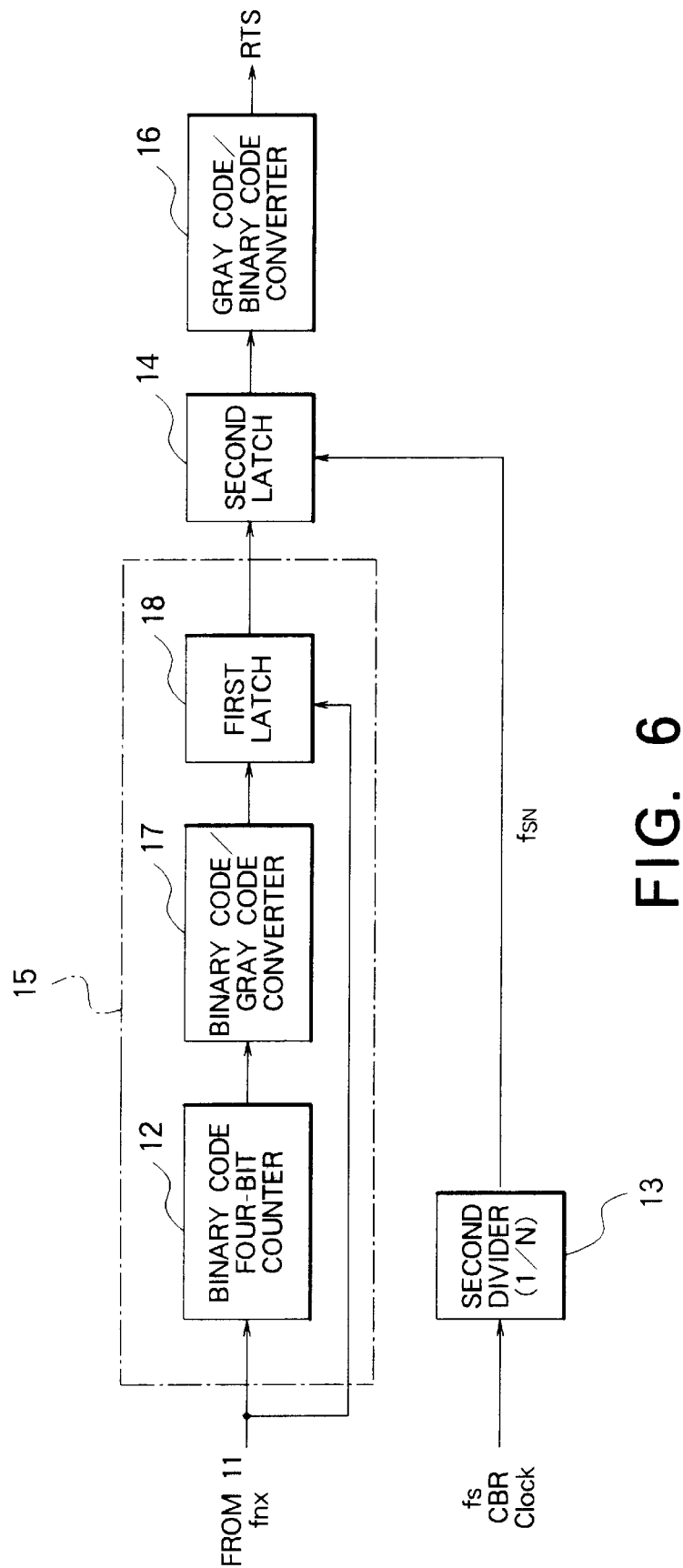
FIG. 6 is a block diagram view of an RTS generating circuit according to still another embodiment.

Referring to FIG. 6, another modification is shown, wherein a first latch circuit 18 is additionally provided on the output of the binary code/Gray code converter 17 in FIG. 5. A second latching circuit 14 is connected to the output of the first latch circuit 18. The second latch circuit 14 corresponds to the latching circuit 14 in FIGS. 3 and 5.

The first latch circuit 18 can be arranged as four D-flipflops similar to the latch circuit 14 shown in FIG. 1. However, the first latch circuit 18 latches the four-bit counter output of the Gray code in response to the network reference clock signal $f_{nx}$ to thereby remove the glitch which may accompany the four-bit counter output of the Gray code due to the binary code/Gray code conversion.

Therefore, the RTS generating circuit of FIG. 6 is more reliable in comparison with the circuit of FIG. 5.

In the embodiments described above, although the latch circuit has been described to comprise D-flipflops, it is possible to use various other latch circuits which are known in the art. Further, the Gray code counter, the Gray code/binary code converter, and the binary code/Gray code converter are per se known in the art. Therefore, they could be selected from those known in the art.

What is claimed is:

1. An RTS (Residual Time Stamp) generating circuit for use in an ATM (Asynchronous Transfer Mode) network to transfer to a user's signal using a network clock signal of a network clock frequency, the network clock signal being frequency-divided by a predetermined dividing value to form a network reference clock signal of a divided frequency as a network reference frequency, said user's signal having a user's clock signal having a user's clock frequency, which comprises:

counter means for counting said network reference clock signal to produce a counted number on the base of the Gray code;

dividing means responsive to said user's clock signal for frequency-dividing said user's clock frequency to produce a divided signal of a divided frequency as a latching pulse signal; and latching means coupled to said counter means and said dividing means and responsive to said latching signal for latching said counted number to produce a latched number of the Gray code, said latched number providing the RTS signal, wherein a racing condition is substantially prevented by said RTS generating circuit.

2. An RTS generating circuit as claimed in claim 1, which further comprises frequency dividing means for dividing said network clock signal to produce said network reference clock signal.

3. An RTS generating circuit as claimed in claim 1, which further comprises converter means for converting said latched number of the Gray code into a number of the conventional binary code as the RTS signal.

4. An RTS generating circuit as claimed in claim 1, wherein said counter means is a four-bit counter for delivering the lower four bits of the counted number of the Gray code.

5. An RTS generating circuit as claimed in claim 4, wherein said latching means comprises four D-flipflops.

6. An RTS generating circuit as claimed in claim 1, wherein said counter means comprises binary counter means for counting said network reference clock signal to produce a binary counter output, and binary code/Gray code converting means for converting said binary counter output to produce a converted output of Gray code, said converted output of Gray code providing said counted number of the Gray code.

7. An RTS generating circuit as claimed in claim 6, which further comprises an additional latching means coupled between said binary code/Gray code converting means and said latching means, and responsive to said network reference clock signal for latching said converted output of Gray code to deliver a latched converted output of Gray code as said converted output of Gray code to said latching means.

8. An RTS (Residual Time Stamp) generating circuit for use in an ATM (Asynchronous Transfer Mode) network for producing an RTS signal, said RTS generating circuit comprising:

a first divider responsive to a network clock signal, wherein said first divider divides said frequency of said network clock signal by a first constant to produce a network reference clock signal;

a Gray code counter, wherein said Gray code counter continuously receives said network reference clock signal and produces a Gray code number based thereon;

a second divider, wherein said second divider frequency-divides a user signal by a second constant and produces a latching pulse signal at an output therefrom; and a latching circuit having first and second input terminals, wherein said Gray code counter and said second divider are respectively coupled to said first and second input terminals, wherein said latching circuit latches said Gray code number to produce a latched number of the Gray code.

9. An RTS generating circuit as claimed in claim 8, wherein said RTS signal is represented by said latched number of the Gray code.

10. An RTS generating circuit as claimed in claim 8, which further comprises a Gray code/binary code converter, wherein said Gray code/binary code converter converts said latched Gray code number to a binary code signal, thereby generating said RTS signal.

11. An RTS generating circuit as claimed in claim 10, wherein said Gray code counter is a four-bit counter for delivering the lower four bits of the counted number in the Gray code.

12. An RTS generating circuit as claimed in claim 11, wherein said latching circuit comprises a plurality of D-flipflops.

13. An RTS generating circuit as claimed in claim 10, wherein said Gray code counter further comprises a binary code four-bit counter for counting said network reference clock signal to produce a binary output, and a binary code/Gray code converter to convert said binary output from said binary code four-bit counter and produce said Gray code number.

14. An RTS generating circuit as claimed in claim 13, which further comprises a second latching circuit coupled between said binary code/Gray code converter of said Gray code counter and said latching circuit, wherein said first latching circuit receives said network reference clock signal and latches said binary output from said binary code/Gray code converter, and wherein said second latching circuit provides a latched Gray code signal to said latching circuit.

15. A method for generating an RTS (Residual Time Stamp) signal for use in an ATM (Asynchronous Transfer Mode) which comprises the steps of:

dividing a network clock signal to form a network reference clock signal;

counting said network reference clock signal to produce a counted number based on the Gray code;

dividing a user clock signal to produce a latching pulse signal; and latching said counted Gray code number based on said latching pulse signal to produce a latched Grey code number.

16. An RTS signal generating method as claimed in claim 15, which further comprises the steps of:

converting said latched Gray code number into a binary number; and providing said binary number as said RTS signal.

17. An RTS signal generating method as claimed in claim 16, wherein said counting step includes providing the lower four bits of said counted number of the Gray code using a four-bit counter.

18. An RTS signal generating method as claimed in claim 15, which further comprises the steps of:

counting said network reference clock signal to produce a binary counter output; and, converting said binary counter output to produce said counted number based on the Gray code.

19. An RTS signal generating method as claimed in claim 18, which further comprises the steps:

latching said counted number of the Gray code; and, delivering said latched number of the Gray code to be latched again, based on said latching pulse signal.

20. An RTS signal generating method as claimed in claim 15, which further comprises the step of:

providing said latched Grey code number as said RTS signal.

* * * * *